Figure 1:
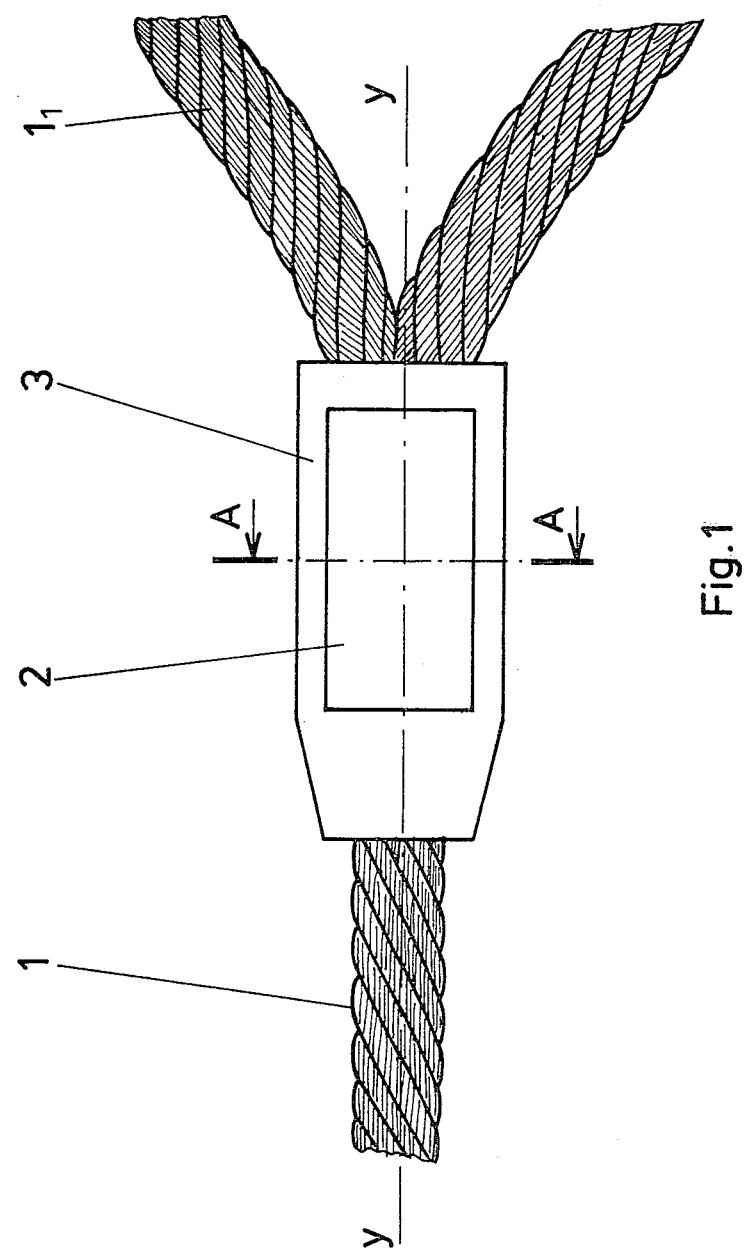

United States Patent [19]

Bourard et al.

[11] 4,242,777
[45] Jan. 6, 1981

[54] MARKED CABLE SLING

[76] Inventors: Daniel P. J. Bourard, Thibermont by Neuville les Dieppe; Michel J. Garconnet, 22, rue du Docteur Vitet, Saint Nicolas d'Aliermont, both of France

[21] Appl. No.: 923,782

[22] Filed: Jul. 12, 1978

[30] Foreign Application Priority Data

Jul. 13, 1977 [FR] France ................. 77 21798

[51] Int. Cl.³ .............................................. F16G 11/00
[52] U.S. Cl. ................... 24/115 A; 24/129 W; 29/517; 29/509; 29/522 R
[58] Field of Search ............... 29/518, 517, 521, 509, 29/522 R; 24/115 A, 115 K, 129 W

[56] References Cited

U.S. PATENT DOCUMENTS

| 958,641 | 5/1910 | Heeren | 29/521 UX |
| 2,346,412 | 4/1944 | Bratz | 29/518 X |
| 2,375,480 | 5/1945 | Lee | 29/521 UX |
| 2,476,731 | 7/1949 | Hobbs | 29/518 X |
| 2,983,976 | 5/1961 | Ehmann | 24/129 W X |

Primary Examiner—Charlie T. Moon
Attorney, Agent, or Firm—Brown, Flick & Peckham

[57] ABSTRACT

Process for marking slings or the like having a malleable metal sleeve crimped to the sling cable loop, characterized in that intaglio marking is effected on a plate, the plate is introduced into one of the sleeve shaping dies and the press is operated to simultaneously shape the plate and anchor it by stamping into the sleeve.

3 Claims, 4 Drawing Figures

MARKED CABLE SLING

The invention relates to a process for marking slings, as well as to slings obtained by the realisation of this process.

At present, sling manufacturers are required to mark their products in order to indicate the working load of the slings, their name and address. This is obtained by inscribing the information on a sling sleeve, either by using a stencil, or by using a punch.

However, these marking processes have the disadvantage that marking produced by a stencil using paint is not durable and is soon removed in use, whilst marking by means of a punch is also not very durable and takes a long time.

The object of the present invention is to obviate these disadvantages and to this end relates to a process for marking slings or the like having a malleable metal sleeve crimped to the sling cable loop, characterised in that intaglio marking is effected on a plate, the plate is introduced into one of the sleeve shaping dies and the press is operated to simultaneously shape the plate and anchor it by stamping into the sleeve.

According to another feature of the invention, the shaping of the plate and its anchoring in the sleeve are effected during the operation of crimping the sleeve to the sling cable.

According to another feature of the invention, the plate is introduced into one of the dies after preshaping the sleeve on the cable and the press is then operated to bring about the final shaping of the sleeve and the anchoring of the plate.

The invention also relates to slings obtained by the realisation of this process.

The invention is described in greater detail hereinafter relative to non-limitative embodiments and with reference to the attached drawings, wherein show:

FIG. 1 a part plan view of a sling according to the invention.

Figure 2:
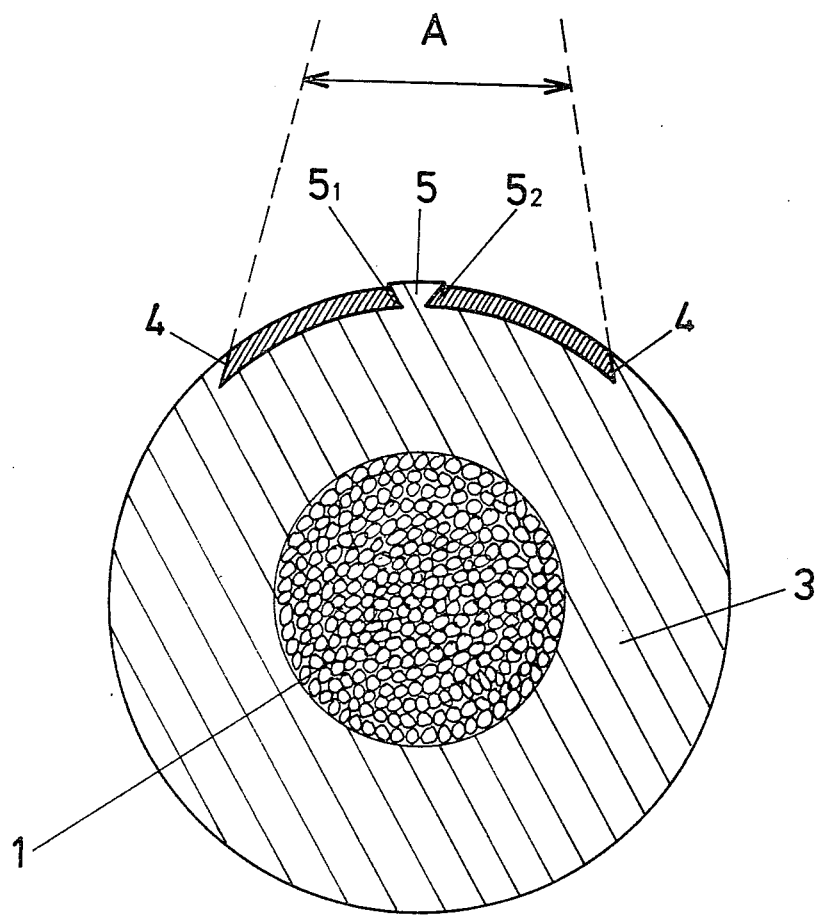

FIG. 2 a section along the line A—A of FIG. 1.

Figure 3:
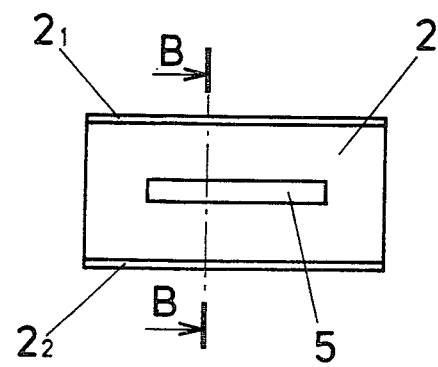

FIG. 3 a plan view of a marking plate.

Figure 4:
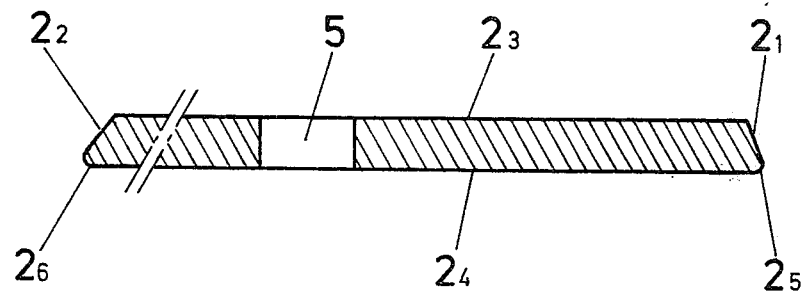

FIG. 4 a section along the line B—B of FIG. 3.

The object of the present invention is to provide slings which in a durable manner contain details of the name and address of the manufacturer and the working load of the sling, these inscriptions being applied in a rapid manner and preferably during the manufacture of the sling, i.e. without a supplementary operation being necessary.

Thus, the process of the invention makes it possible to reduce the manufacturing price of the slings. Furthermore, this process constitutes a means for guaranteeing the strength and stability of the sling.

The process of the invention comprises marking sling 1 by means of a plate 2, which is stamped in sleeve 3, crimped to the end of the cable of sling 1 to form loop $1_1$.

Preferably, stamping is performed during the crimping of the sleeve onto the cable and in this case the press is operated once for preshaping the sleeve on the cable. The plate is then placed in one of the two shells of the press which is operated again to give the plate the shape of the sleeve periphery by shaping between the inner wall of the shell and the periphery of the preshaped sleeve, to definitively crimp the sleeve onto the cable and simultaneously to anchor the plate in the sleeve by stamping.

Thus, during the second operation of the press, the sleeve material which is a malleable aluminium-based metal, flows on the periphery of the plate so as to bring about an anchoring or crimping of its edge.

Thus, the marking obtained in this way guarantees the stability of the sling in view of the fact that for as long as the plate is crimped on the sleeve, this guarantees that the said sleeve has not been deformed and therefore that the crimping of the sleeve to the cable has not been damaged.

However, if on the site the sleeve is deformed by crushing, the marking plate is immediately disengaged, which therefore indicates to the user that the sling crimping is damaged and that it must no longer be used.

In addition, the presence of the plate on the sling sleeve is used by safety officials to confirm the good condition of the sling, the latter being guaranteed by the name of the manufacturer indicated on the plate.

In order to improve the crimping of the plate onto the sleeve, chamfers $2_1$ and $2_2$ are formed on the longitudinal edges of the plate, parallel to the Y—Y axis of the sleeve. These chamfers are adjacent to the upper face $2_3$ of the plate, provided with intaglio markings, in such a way that the sleeve metal can flow on the plate periphery and thus form at 4 a genuine crimping effect by pressing down of the sleeve metal on the chamfered edges of the plate.

The angle of these chamfers is preferably approximately 60° and this angle is in general terms determined as a function of the diameter of sleeve 3, so that after shaping by bending the plate in accordance with a diameter corresponding to the sleeve diameter, the two opposite parallel edges $2_1$ and $2_2$ of the plate, starting from a point external of the sleeve, form an acute angle A of relatively small value.

Moreover, as can be seen in FIG. 4, chamfers $2_1$ and $2_2$ of the plate, adjacent to the upper face $2_3$ provided with intaglio markings, do not extend down to the lower face $2_4$, but instead leave straight portions of limited height $2_5$ and $2_6$. During the operation of stamping the plate in the sleeve said limited height portions prevent the longitudinal edges of the plate from deforming through bending towards the outside of the sleeve, which would prejudice the durability of the anchoring action.

According to the invention, at least one recess is provided within plate 2 into which can flow the metal of the sleeve in order to strengthen the assembly.

Preferably and as shown in the attached drawings, this recess is in the form of a groove 5, longitudinally shaped in the median portion of the plate. The function of the groove is to prevent the plate from jumping out of its seat after stamping due to its own elasticity.

The plate is made from a harder and more elastic material (generally a stainless metal) than the metal forming the sleeve, so that after stamping the plate could otherwise act in the manner of a spring and jump out of its seat.

The edges of groove 5 are preferably straight in view of the fact that, after shaping by bending the said plate, straight edges $5_1$ and $5_2$ assume an inclined position, which is a function of the radius of curvature of the plate, leading to a tapered recess into which can flow, in order to fill, the metal of sleeve 3 in order to strengthen the assembly.

Obviously, the invention is not limited to the embodiments described and represented hereinbefore and various modifications can be made thereto without passing beyond the scope of the invention.

We claim:

1. A sling comprising a cable having an end portion doubled back upon itself to form an end loop, a malleable metal sleeve encircling and tightly engaging the end of the cable and the portion of the cable beside said end, and a transversely curved metal plate embedded in the outer surface of said sleeve and having an exposed outer surface and side edges extending lengthwise of the axis of the sleeve, metal of said sleeve overlying said side edges to hold the plate in place as long as the sleeve is not deformed, said outer surface of the plate being provided with identifying intaglio marking.

2. A sling according to claim 1, in which said plate is formed of a harder and more elastic metal than said malleable metal sleeve.

3. A sling according to claim 1 or 2, in which said plate is provided with a slot extending lengthwise of the cable, and metal of said sleeve fills the slot to help anchor the plate in the sleeve.

* * * * *